No. 620,488. Patented Feb. 28, 1899.
K. W. McNAUL.
FRUIT STEAMER.
(Application filed June 30, 1898.)
(No Model.)
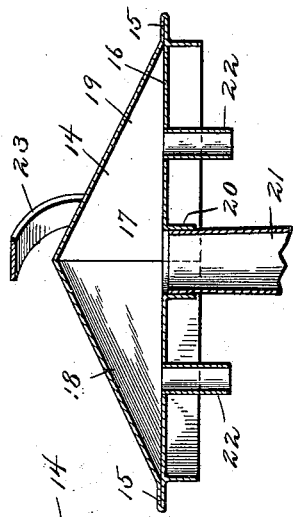
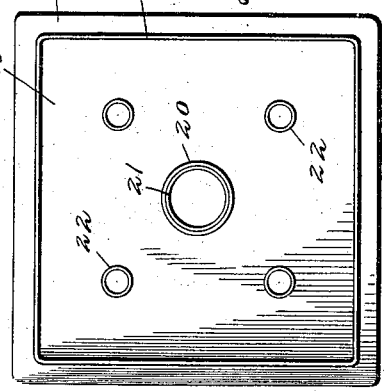
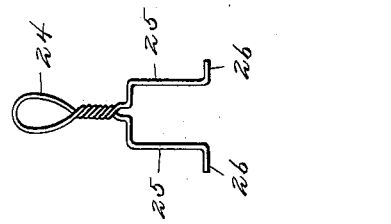
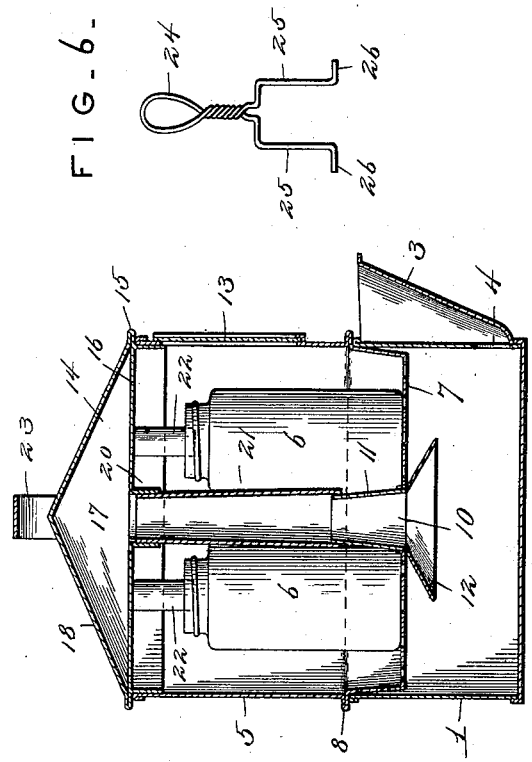
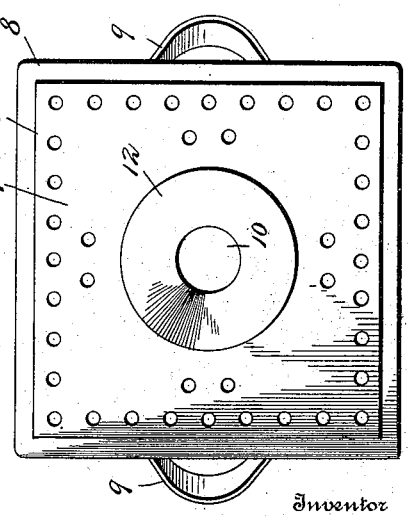
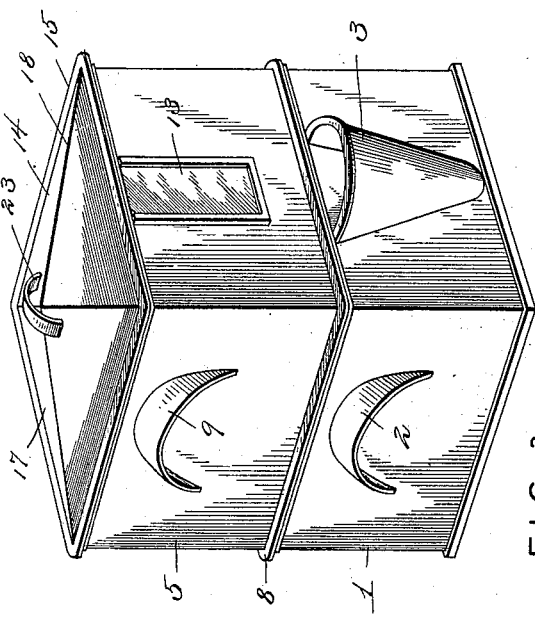
Witnesses
Harry L. Ames.
S. E. Oberlin.
Inventor
Katharine W. McNaul.
by V. S. Stockbridge
Attorney

UNITED STATES PATENT OFFICE.

KATHARINE W. McNAUL, OF MAITLAND, MISSOURI.

FRUIT-STEAMER.

SPECIFICATION forming part of Letters Patent No. 620,488, dated February 28, 1899.

Application filed June 30, 1898. Serial No. 684,856. (No model.)

*To all whom it may concern:*

Be it known that I, KATHARINE W. MC-NAUL, a citizen of the United States, residing at Maitland, in the county of Holt and State of Missouri, have invented certain new and useful Improvements in Fruit-Steamers; and I do hereby declare the following to be a full, clear, and exact description of the invention, such as will enable others skilled in the art to which it appertains to make and use the same.

This invention relates to fruit-steamers, and has for its object to provide a simple and efficient receptacle and cooker especially designed for domestic use in steaming or canning fruit of various descriptions.

One of the chief aims of the present invention is to provide means whereby the steam may be conveyed to the cans or jars of fruit from above as well as beneath and injected separately and independently into each and all of the jars or cans in which the fruit is contained.

The details and advantages of the invention will be fully pointed out in the course of the ensuing description.

The invention consists in a fruit-steamer embodying certain novel features and details of construction and arrangement of parts, as hereinafter fully described, illustrated in the drawings, and incorporated in the claims.

In the accompanying drawings, Figure 1 is a perspective view of a fruit-steamer constructed in accordance with the present invention. Fig. 2 is a vertical central section through the same, showing the jars of fruit in place. Fig. 3 is a bottom plan view of the intermediate section or receptacle in which the fruit is placed. Fig. 4 is a bottom plan view of the removable top or cover. Fig. 5 is a detail section through the cover, taken diagonally. Fig. 6 is a detail view showing a jar or can lifter.

Similar numerals of reference designate corresponding parts in the figures of the drawings.

Referring to the drawings, 1 designates the lower section, forming a receptacle for water. This lower section may be of any size or shape and is of suitable depth to contain the required quantity of water to be heated. The section 1 is provided on opposite sides with lifts or handles 2 and also at one side with a spout 3, which is of half-conical form with the larger open end uppermost. The side of the receptacle 1, to which the spout 3 is applied, is provided with an opening 4 near its bottom, so that water poured into the spout will find its way into the receptacle. By means of the spout the level of the water in the receptacle 1 may be observed at any time and replenished when necessary. 5 designates the fruit-receptacle, forming the second or intermediate section of the steamer. The section 5 is somewhat deeper than the section 1, being of sufficient depth to receive the cans or jars (indicated at 6) and of a size proportionate to the number of jars or cans. The section 5 is provided with a perforated bottom 7, through which the steam passes from section 1, the jars or cans being placed upon said perforated bottom. The bottom of the section 5 sets down within the section 1 and is provided with a surrounding horizontal ledge or flange 8, which rests on the top edge of the section 1. The fruit-receptacle 5 is provided upon opposite sides with lifts or handles 9. It is also provided with a central opening 10 in the bottom 7, from which a tapering tube 11 extends upward a short distance within the section 5.

A steam concentrating and gathering cone 12 is attached to the lower side of the bottom 7 for gathering and conveying the steam to and through the tube 11. The receptacle 5 is further provided in one side with a glass-covered opening 13, extending vertically, through which the condition of the fruit may be observed.

The upper section or cover 14 fits within the upper end of the section 5 and comprises a horizontal flange 15, which rests on the top edge of the section 5. The cover comprises a flat horizontal bottom wall 16 and a pyramidal upper wall 17, comprising a plurality of crests or ridges 18 upon the lower side of the wall 17, forming steam troughs or channels 19. The space between the walls 16 and 17 forms a steam receiving and distributing chamber, the steam being received through a centrally-located depending sleeve or tube 20, into which fits or telescopes the upper smaller end of a pipe or tube 21, the lower end of which fits over and surrounds the tube 11 in the receptacle. The bottom wall 16 of the cover is also provided with a number of depending smaller tubes 22, one for and located immediately above each can or jar of fruit. Each of the tubes is also located in vertical alinement with and beneath the troughs or channels 19, so that the steam which enters through the central tube is collected in the troughs 19 and forced downward through the tubes 22 directly on top of the fruit in each can or jar. The top or cover 15 is provided with an upwardly-extending bail-shaped handle 23, by means of which it may be lifted.

From the foregoing description the operation of the steamer will be readily understood. Water is poured into the lower section or receptacle 1 through the spout 3 and the device placed upon a heating-stove. The top 15 is removed and the jars of fruit are placed therein, so that they will be located immediately beneath the tubes or nozzles 22 when the cover is in position. The cover is then placed upon the section 5, so that the tube 21 will embrace the tube 11. When the water reaches the boiling-point, the steam will pass through the perforated bottom 7 and will also pass upward through the central tube or column into the hollow cover 15. The pressure of the steam will cause it to be distributed to the several tubes or discharge-nozzles 22, the result of which will be that a number of jets of steam will be forced downward into the several jars or cans of fruit. In this manner steam will be supplied both from above and beneath and be injected directly into the fruit, thereby reducing to a minimum the time required to treat the fruit.

The condition of the fruit may be observed at any and all times through the observation-opening 13. When the fruit has been sufficiently cooked or steamed, the cover 15 is removed to enable the jars or cans to be taken out.

In Fig. 6 I have shown a simple wire lifter for removing the jars or cans. The lifter consists simply of a piece of wire bent to form a central finger-loop or handle 24 and oppositely-projecting spring-arms 25, with horizontally-disposed extremities 26, designed to engage beneath the arm or flange at the top of the jar-receptacle. The use of this lifter obviates burning or scalding of the hands.

It will of course be understood that the steamer may be made in various sizes and shapes, according to the desire of the manufacturer and the number of jars of fruit to be steamed at one time.

Changes in the form, proportion, and minor details of construction may be resorted to without departing from the principle or sacrificing any of the advantages of the invention.

Having thus described the invention, what is claimed as new, and desired to be secured by Letters Patent, is—

1. A fruit-steamer consisting of a lower section or a water-receptacle having at one side a spout communicating with the bottom of the receptacle, for filling purposes, a superimposed section or fruit-receptacle having a perforated bottom fitting within the top of the lower section, an upper section or cover fitting within the top of the second section, said top or cover being hollow, a central steam-supply tube passing through the fruit-receptacle and affording communication between the water-receptacle and cover, and a plurality of depending discharge-nozzles connected to and communicating with the hollow top, substantially as described.

2. A fruit-steamer, comprising a lower section forming a water-receptacle, a superimposed section forming a fruit-receptacle and provided with a perforated bottom, a removable cover fitting upon the fruit-receptacle and provided with a series of discharge-nozzles, and a sectional and telescopic steam-supply tube extending through the fruit-receptacle and affording communication between the water-receptacle and cover, substantially as described.

3. A fruit-steamer, comprising a lower section or water-receptacle, a superimposed section or fruit-receptable having a perforated bottom, a removable hollow cover comprising a flat horizontal lower wall and a pyramidal upper wall forming a series of radiating troughs or channels, a centrally-arranged steam-supply tube passing through the fruit-receptacle and cover, and a plurality of discharge-nozzles depending from the lower wall of the hollow cover and located immediately beneath said troughs or channels, substantially as described.

In testimony whereof I affix my signature in presence of two witnesses.

KATHARINE W. McNAUL.

Witnesses:
R. A. MAYN,
JAMES E. WELLER.